Jan. 2, 1951    I. COWLES    2,536,354
FLANGED TUBE COUPLING
Filed June 27, 1946    3 Sheets-Sheet 1

INVENTOR.
Irving Cowles
BY Rudolph Wm. Lotz
Attorney

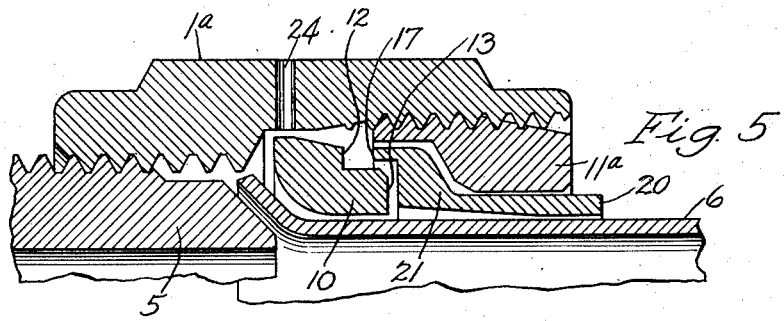
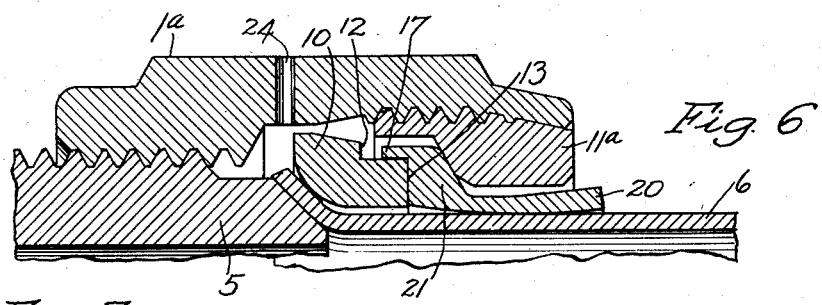
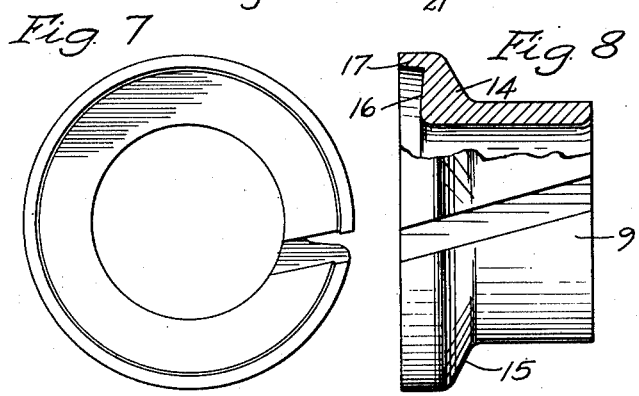
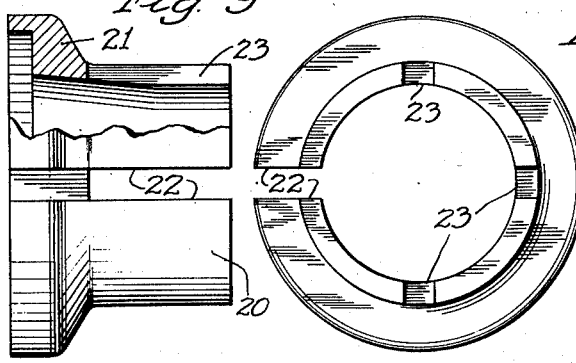
INVENTOR.
Irving Cowles
BY Rudolph Wm Lotz
Attorney Jan. 2, 1951  I. COWLES  2,536,354
FLANGED TUBE COUPLING
Filed June 27, 1946  3 Sheets-Sheet 3
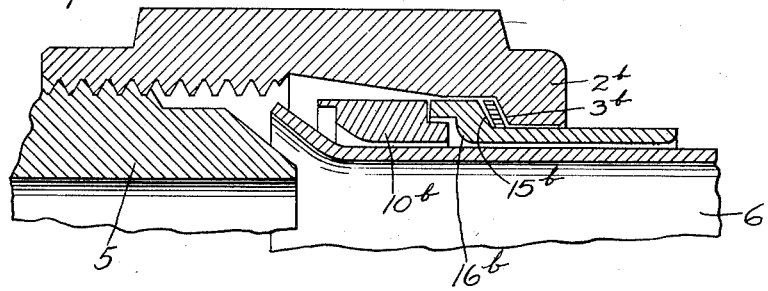
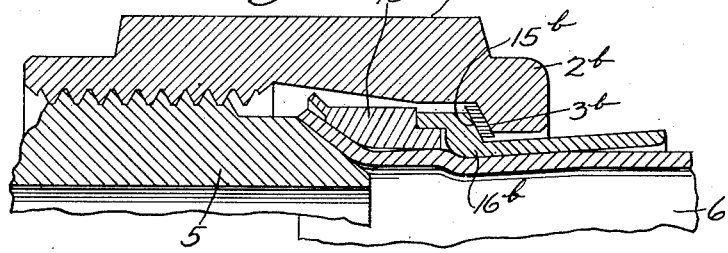
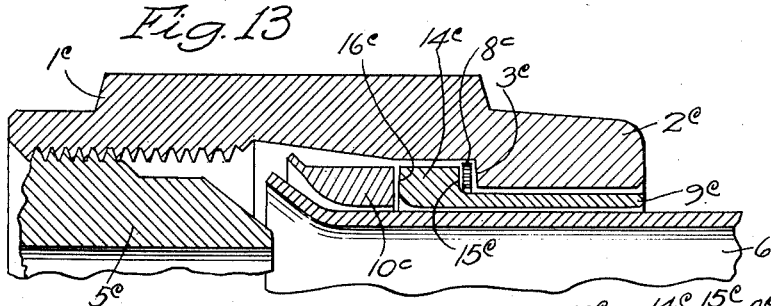
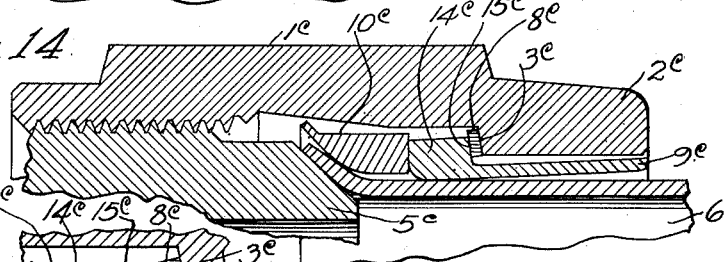
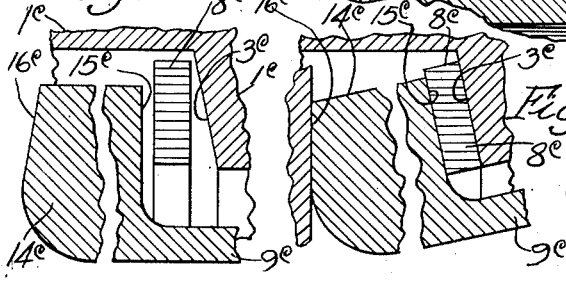
Inventor:
Irving Cowles
By Rudolph Wm. Lotz
Attorney Patented Jan. 2, 1951

2,536,354

UNITED STATES PATENT OFFICE 2,536,354

FLANGED TUBE COUPLING

Irving Cowles, Chicago, Ill.

Application June 27, 1946, Serial No. 679,612

9 Claims. (Cl. 285—86)

This invention relates to improvements in all metal conduits wherein flanged metal tubing is used, and, more particularly, in couplings adapted to be incorporated into such conduits in various embodiments to meet all of the requirements of such conduits as to high and low pressures and their use as to all types of fluids and liquids to be passed therethrough.

The main general object of this invention is to provide a very simple, cheap and efficient conduit wherein the couplings aforesaid are small, light, compact and strong and are proof against loosening under the combined influences of vibration and temperature changes and include means whereby the vibrations of the tubing are absorbed and prevented from concentrating at vulnerable points at which such vibration causes crystallization and fractures of the tubing.

A principal object of the invention is to provide a coupling wherein a resilient split sleeve functioning to engage the conduit tube by contraction and distortion of said sleeve is embodied and so interengaged with other elements as to be capable of expansion and resumption of its normal shape without restriction or resistance upon release of the force which effects its contraction.

Another object of the invention is to render parts of the said couplings to be used interchangeable with other parts to adapt such couplings to meet a variety of needs of the conduits of which they form parts, thereby to reduce the cost of tooling up, and producing the same and requirements of manufacturers and dealers with respect to maintaining stocks on hand of a variety of said couplings to meet demands of purchasers, as fully explained hereinafter.

Other objects of the invention are either pointed out specifically or will be readily comprehended by persons skilled in the art to which the invention relates.

In the accompanying drawings:

Figs. 5 and 6 are views similar to Figs. 3 and 4, respectively, illustrating another embodiment of the invention.

Fig. 7 is an end elevation, on an enlarged scale, of the split sleeve of the structure shown in Figs. 1 to 4 inclusive.

Fig. 8 is a fragmentary side view, partly in section, of the split sleeve shown in Fig. 7.

Figs. 9 and 10 are views similar to Figs. 7 and 8, respectively, showing the split sleeve of the coupling of Figs. 5 and 6.

Figure 1:
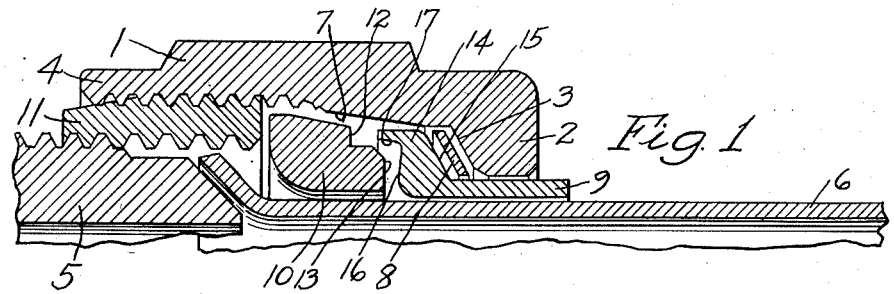
Fig. 1 is a radial longitudinal sectional view of a partially completed coupling constructed in accordance with the invention.
Figure 2:
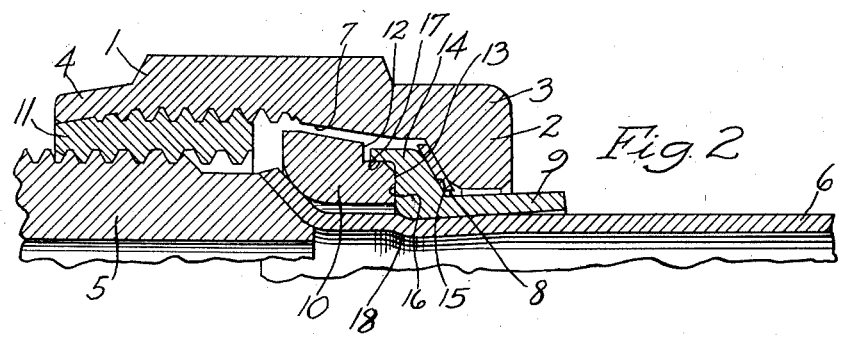
Fig. 2 is a view similar to Fig. 1 showing the coupling of the latter completed and disposed in fluidtight association with a tube.

Figs. 11 and 12 are views similar to Figs. 1 and 2, respectively, illustrating another embodiment of the invention.

Figs. 13 and 14 are views similar to Figs. 11 and 12, respectively, showing still another embodiment of the invention.

Fig. 15 is a fragmentary radial sectional view, on an enlarged scale, illustrating in an exaggerated manner parts of the structure of Figs. 13 and 14 in their initial relative positions.

Fig. 16 is a view similar to Fig. 15 showing the same parts in their final relative positions.

The structures of Figs. 1 to 4 inclusive, illustrate embodiments of the coupling of this invention to be associated with tubing of high pressure type, while Figs. 5 to 14 inclusive, illustrate embodiments of the invention for association with low pressure type tubing.

All of the couplings illustrated embody the principles illustrated and described in prior patents to applicant, but mainly Patent No. 2,389,233, issued Nov. 20, 1945, and Patent No. 2,320,813.

The coupling of the aforesaid first-named patent is adapted for use only in low pressure conduits without necessitating a substantial increase in size and weight of the structure, whereas, in the instant invention, the diametric dimensions of the sleeve nut of the coupling need to be very much less larger for high pressure uses than is true of the coupling of the said patent, and this applies also to the lengths of the respective sleeve nuts.

Patent No. 2,320,813 illustrating an intended high pressure structure is also referred to and distinguished from the present invention as particularly explained hereinafter.

In the structure of Figs. 1 and 2, the coupling comprises the sleeve nut 1 equipped with an integral terminal flange 2 which presents an inner annular shoulder 3 of frusto conical form (hereinafter referred to as tapered) the surface of which extends at an angle of thirty degrees to a plane perpendicular to its axis in the instance illustrated, said angle having been found most desirable but being subject to appreciable change without serious detriment to efficiency of the structure.

The internally threaded mouth portion 4 of said nut 1 is of far larger diameter than the threaded end of the seat fitting 5 upon which the tube 6 seats, the smooth bore 7 of the nut 1 being of progressively decreasing diameter from said thread of the mouth portion to its meeting with the shoulder 3 of the flange 2.

A dished washer 8, split sleeve 9 and a tube flange engaging ring member 10 (hereinafter referred to as the flare ring) are inserted into the sleeve nut 1 before the sleeve 11 is inserted, the latter being of smaller inner diameter at its outer end portion than the remainder of its length and being rendered absolutely rigid with the nut 1 by contracting the corresponding portion of its threaded mouth via a well-known swaging operation.

Thus the inserted parts 8, 9 and 10 are trapped against removal from the nut 1 but remain movable relative to each rotatably and longitudinally of the nut 1.

The flare ring 10 presents a mouth portion of progressively increasing inner diameter which receives a portion of the flange of the tube 6.

The said ring 10 is of greatest diameter at its mouth and of progressively decreasing diameter to the annular inner corner recess 12 which presents the annular cylindrical shoulder bordering the annular inner end surface 13 which is perpendicular to the axis of the ring 10.

The split sleeve 9 is equipped with a single longitudinal slot extending from end to end thereof and includes the annular flange 14. The latter presents the tapered shoulder 15 opposed to the washer 8 interposed between the same and the shoulder 3 of the nut. The taper of the shoulder 15 differs from that of the shoulder 3 by three degrees, in the instance illustrated, the washer 8 being dished to present parallel surfaces which may differ slightly in angular inclination from both shoulders 3 and 15 or equal to the taper of either one thereof.

In the absence of the washer 8, the shoulders 3 and 15 would meet along the periphery of the latter. The presence of the washer 8 effecting no change in the performance of the function of said shoulders.

The inner end surface 16 of the flange 14 is also tapered at an angle of three degrees to a plane perpendicular to the split sleeve axis, in this instance, to correspond with the difference in tapers of the shoulders 3 and 15 but said surface 16 meets the opposed end surface of the ring 10 along the smallest diameter portion of the surface 16.

The latter is bordered by the annular flange 17 which is of greater inner diameter than the surface of the recess 12 opposed thereto.

The washer 8 and sleeve 9 are composed of resilient metal, the bore of the sleeve 9 being cylindrical of diameter slightly in excess of the outer diameter of the tube 6 of greatest tolerance diameter specified to be acceptable.

The inner diameter of the flange 17 is so much in excess of the diameter of the annular shoulder opposed thereto and which operates to limit the degree to which the flange 14 of the sleeve 9 may be contracted, to permit the contraction of the innermost end portion of the flange 14 to a diameter slightly less than that of the tube 6, the width of slot or gap in the tube 9 being sufficient to avoid its closure when the flange 17 is engaged with the said shoulder opposed thereto.

If the tube 6 is of specified diameter of onehalf inch, the tolerance allowances applicable thereto may be plus or minus ten thousandths of an inch, and, therefore, the degree to which the flange 14 may be contracted is fixed by the smallest tolerance diameter tube 6 used plus, for example, another five thousandths of an inch to allow for that degree of contraction of the said tube, such contraction being shown at 18 in Fig. 2.

In assembling a conduit, the shoulder 3 bears upon the shoulder 15 and, in cooperation with the end surface of the ring 10, causes the sleeve 9 to be contracted to the limit fixed by the flange 17.

Obviously every part of the sleeve 9, from its innermost to its outermost end, resists contraction. The latter being effected by distortion of the flange 9 by pressure exerted substantially longitudinally thereof until the end surface of the ring 10 meets the opposed surface 16 and, at the same time, the shoulders 3 and 17 become parallel with each other, said sleeve 9 operates as a very powerful compression spring. The force of the latter is exerted against the flange of the nut and thus places a heavy stress on the threads of the same and the fitting 5 which causes such strong frictional resistance to their relative rotation that the nut will not loosen under the combined influences of vibration and temperature changes.

As distinguished from the structure of the patents referred to above, the above described structure presents several advantages in that the ring 10 is not reamed out at the end opposed to the split sleeve and, therefore, is stronger and cheaper. Another advantage lies in the fact that in the instant structure, the flanged inner end of the split sleeve does not become set to the same degree as the tapered end of the split sleeve of Patent No. 2,389,233, and also in that there is no frictional resistance offered to expansion of the split sleeve comparable with that incident to the projection of the tapered nose end of the last-mentioned split sleeve into the flare ring.

The degree of spring force exerted upon the nut 1 and fitting 5 of the instant structure is determined, mainly, by the volume of metal contained in the flange 14 and this can be increased by lengthening said flange and shortening the flare ring to an extent no greater than the required expansion stress resistance of the latter will permit.

As pointed out in the specification of the lastmentioned patent, the split sleeve of the latter takes a set to a degree making it necessary to force the tube through the same when removing said tube for replacement by another. It is obvious also that the split ring of said Patent No. 2,389,233 is omitted and the undercutting of the nut bore is also avoided.

Another advantage lies in the fact that while the structure of the last-mentioned patent may be incorporated into a high pressure coupling by increasing the diametric dimensions of all parts thereof without other changes, these increases will be greater than in the instant coupling and thus increase the bulk and cost to a far greater degree than is true of the difference in cost of the high pressure and low pressure structures of the instant structure.

Figure 3:
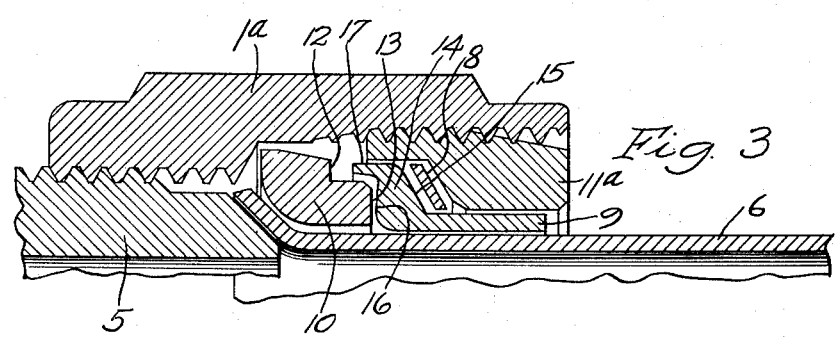
Figs. 3 and 4 are views similar to Figs. 1 and 2, respectively, showing another embodiment of the invention.
Figure 4:
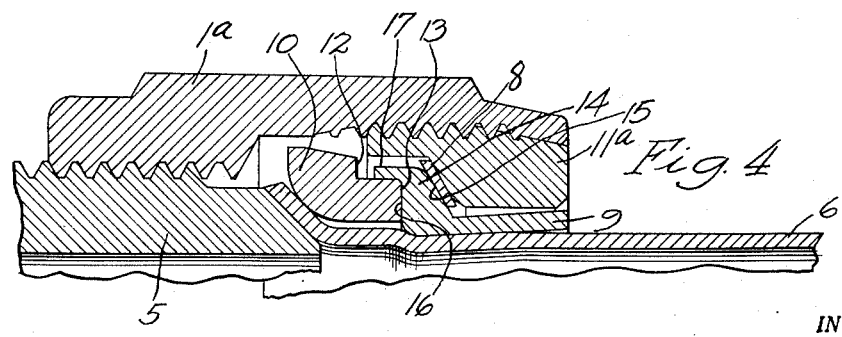

As to the structure of Patent No. 2,320,813, Fig. 4, the instant invention presents the same advantages as apply to Patent No. 2,389,233, generally, plus that of providing a closure for the enlarged bore of the earlier patent (see Figs. 3 and 4 of this application) which will not yield to the force which could not be withstood by the inturned flange of the nut of Fig. 4 of same in assembling a conduit.

All of these advantages result in appreciable production cost reductions and increased efficiency.

Fig. 2 of the drawings of this application illustrates the conduit parts completed and assembled.

The structure of Figs. 3 and 4 differs from that of Figs. 1 and 2 in no respect otherwise than that the mouth portion of the nut 1a is equipped with an integral thread to engage that of the fitting; that the same identical parts 10, 9 and 8 are inserted in that order into said nut 1a before the threaded sleeve 11a is inserted and secured rigidly in place by a swaging operation as explained above with respect to the sleeve 11.

The structure of Figs. 5 and 6 is identical, mainly, with that of Figs. 3 and 4, the only distinction from latter lying in type of split sleeve used.

The split sleeve of Figs. 1 to 4 is shown in Figs. 7 and 8, while that incorporated in and substituted for the sleeve 9 in Figs. 5 and 6 is shown in Figs. 9 and 10.

Conduits of the type shown in Figs. 5 and 6 are used in the refrigeration art and must provide ample drainage of water of condensation from the couplings in order to overcome breakages incident to the freezing of such water within said couplings.

To this end the sleeve 20 is equipped with a cylindrical bore from its outer extremity to a point between its ends corresponding in diameter with the bore of the sleeve 9, the said bore being of progressively greater diameter from the inner end of said cylindrical bore to and through the flange 21. The latter and the nut shoulder opposed thereto are identical with the flange 14 and shoulder 3 of Figs. 1 to 4, but, because of the increased inner diameter of the flange 21, the latter remains spaced slightly from the tube 6 when the conduit is assembled, as shown in Fig. 6, but as the contraction of said flange 21 is effected, the inner end of the cylindrical bore portion of the sleeve 20 is contracted to engage the tube 6, and, as the said contraction continues until the flange 17 engages the opposed annular shoulders, the outer end portion of the split sleeve is expanded to become spaced progressively farther from the tube, while the pressure of the middle portion of the split sleeve upon the tube 6 is increased.

As shown in Figs. 9 and 10, the sleeve 20 is equipped with one slot 22 extending from end to end thereof and additional slots 23 extending from its outer extremity to but not through the flange 21. Unless a plurality, preferably a total of not less than 4 slots shown are provided, the expansion of the outer end portion of said sleeve 20 will not occur.

The normally free space within the coupling nut 1a of Fig. 6 has a vent through the slot 22 and, because the innermost ends of the slots 23 communicate with the annular space bordered by the flange 21 when the conduit assembly is completed, drainage occurs through them also. Openings 24 in the nut 1a afford drainage of all other free space within the nut.

Figs. 11 and 12 illustrate a low pressure conduit which differs from those of Figs. 1 to 4 only as to diametric dimensions, mainly, the nut 1b being a unitary member having an undercut bore portion between the flange 2b thereof and its threaded mouth portion, the opposed shoulders 3b and 15b, and of the end surface of the flare ring 10b and shoulder 16b corresponding as to angular relation to each other as in the structures of Figs. 1 to 4.

In the structure of Figs. 13 and 14, and as best illustrated in Figs. 15 and 16, the flange 2c of the nut 1c (which corresponds with the nut 1b of Figs. 11 and 12) is equipped with an inner shoulder 3c, corresponding in taper with the shoulder 3 of Figs. 1 to 4. The flange 14c of the split sleeve 9c is equipped with tapered shoulders 15c and 16c, the flare ring 10c having an end surface perpendicular to its axis.

In this structure, the recess 12 and the flange 17 of Figs. 1 to 4 are omitted because, due to the greater length proportionately to the diameter of the flange 14c than is true of the structures of Figs. 1 to 4, the said flange cannot be contracted with sufficient force to effect any contraction of the tube 6, but is merely brought into firm engagement therewith as shown in Fig. 14.

The washer 8c interposed between the shoulders 3c and 15c is normally flat and is composed of resilient metal, and, as shown in Figs. 15 and 16, wherein the degree of taper of said last-named shoulders and end surface or shoulder 16c is exaggerated for purpose of better illustration, said washer becomes dished as the sleeve nut 1c is tightened to complete the conduit assembly. Said washer thus acts as a relatively powerful spring, the force of the same being added to the spring force of the split sleeve 9c to increase frictional resistance to the relative rotation of the nut 1c and the fitting 5c in either direction and thus constitutes an aid in the prevention of such rotation anticlockwise to prevent loosening of the nut 1c under the influence of vibration and temperature changes.

As pointed out in the aforesaid patents, the split sleeves of all of the above described structures serve to absorb or dampen vibration stresses on the tube 6 to prevent the same from concentrating upon the point of engagement of the said sleeve with said tube 6 or upon the point of junction of the flange of the tube 6 with the body of same.

In all instances wherein the innermost end portion of the split sleeve effects contraction of the tube, as in Figs. 2, 4, and 12, said sleeve operates to relieve the flanged end portion of the tube 6 of at least a great part of tension and tortional stress to which it is subjected in some instances.

The main distinction of the present invention from the prior lies in the provision of the flat end surface of the flare ring in combination with the opposed end shoulder of the split sleeve and the opposed surfaces or shoulders of the flange of the nut and the shoulder of the flange of the split sleeve opposed thereto, whereby resistance to expansion or return of the split to its normal shape is eliminated as the sleeve nut becomes loose.

The above distinction also comprehends that in the prior patents above-named, the nose end portion of the split sleeve is required to move longitudinally, relative to the flare ring, to the point at which the same has expanded sufficiently to release the tube to permit the latter to be moved toward the mouth of the sleeve nut, thus requiring a greater number of rotations of the latter, anti-clockwise, than in the structure of the instant invention before the tube is so released.

I claim as my invention:

1. A flanged tube coupling comprising a fitting equipped with a seat for the tube flange, a sleeve nut engageable with said fitting and equipped with an internal annular flange, a flare ring loosely mounted within said nut to seat upon the tube flange at one end and presenting a flat annular other end shoulder perpendicular to its axis, a resilient contractible split sleeve projecting through the nut flange and equipped within said nut with an annular flange presenting an annular shoulder opposed to the inner annular shoulder of the nut flange and with an annular terminal shoulder opposed to the end surface of said flare ring, said shoulders of the split sleeve flange being tapered in respectively reverse order with the smallest diameter portion of the inner end shoulder opposed to innermost portion of the ring shoulder, and the greatest diameter portion of the other flange shoulder opposed to the nut flange, the inner shoulder of the latter being tapered angularly to the opposed shoulder equally with the taper of said terminal shoulder of the split sleeve relative to the flat ring shoulder.

2. A structure, according to claim 1, wherein the opposed pairs of shoulders are disposed at an angle of substantially three degrees to each other.

3. A structure, according to claim 1, wherein the flare ring shoulder is bordered by an annular recess and the flange of the split sleeve is bordered by a peripheral flange of normally greater diameter than the smallest diameter portion of said recess for cooperation with the latter to limit the degree to which the flange of said split sleeve is contractible.

4. A structure, according to claim 1, wherein the opposed pairs of shoulders are disposed at an angle of substantially three degrees to each other, and wherein the flare ring shoulder is bordered by an annular recess and the flange of the split sleeve is bordered by a peripheral flange of normally greater diameter than the smallest diameter portion of said recess for cooperation with the latter to limit the degree to which the flange of said split sleeve is contractible.

5. A structure, according to claim 1, wherein the split sleeve is equipped with a cylindrical bore portion along its outer end and with a flared bore portion meeting said cylindrical bore portion and extending through its flange.

6. A structure, according to claim 1, wherein the split sleeve is equipped with a cylindrical bore portion of greater diameter than said tube and with a flared bore portion meeting said cylindrical bore portion and extending through its flange, and wherein means are included for causing the smallest inner diameter of said split sleeve to engage a tube and become flared along said cylindrical bore portion as said split sleeve is contracted throughout its length while its flanged end portion remains spaced from said tube.

7. A structure, according to claim 1, wherein a resilient metal washer is interposed between the flange of the sleeve nut and the shoulder of the flange of the split ring opposed thereto, the shape of said washer between its periphery and its central opening differing normally from the shapes of either of the shoulders opposed thereto and being flexed to occupy all space between the latter as the said sleeve nut attains the limit of its movement relative to the said fitting.

8. A structure, according to claim 1, wherein the sleeve nut is equipped at one end with a threaded sleeve inserted thereinto and wherein the end portion of the sleeve nut containing said sleeve is contracted in part to render said sleeve non-rotatable relative to said nut.

9. A structure, according to claim 1, wherein the sleeve nut is equipped between its ends with a bore portion of greater diameter than the end portion thereof engageable with said fitting and wherein the flare ring is of larger outer diameter than said last-named end portion of said sleeve nut, the outer end portion of the latter being threaded internally and being of diameter to receive said flare ring and an externally threaded sleeve engaged in the said outer end portion of said nut against rotation relative thereto, said sleeve constituting a substitute for a flange integral with said nut and shaped at its inner end to perform the function of the nut flange first above mentioned.

IRVING COWLES.

REFERENCES CITED

The following references are of record in the file of this patent:

UNITED STATES PATENTS

| Number | Name | Date |
|---|---|---|
| 2,389,233 | Cowles | Nov. 20, 1945 |